US006243245B1

(12) United States Patent
Totsuka et al.

(10) Patent No.: US 6,243,245 B1
(45) Date of Patent: Jun. 5, 2001

(54) FORCED-FUSION FUSE AND CIRCUIT BREAKER

(75) Inventors: Mitsuhiko Totsuka; Goro Nakamura, both of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/260,503

(22) Filed: Mar. 2, 1999

(30) Foreign Application Priority Data

Mar. 3, 1998 (JP) ........................................ 10-50978

(51) Int. Cl.[7] ........................................ H02H 5/00

(52) U.S. Cl. .................... 361/103; 361/93.1; 361/115

(58) Field of Search ........................ 361/103, 105, 361/104, 115, 93.1

(56) References Cited

U.S. PATENT DOCUMENTS

| | | | |
|---|---|---|---|
| 3,958,206 | 5/1976 | Klint | 337/406 |
| 4,677,412 | 6/1987 | Sibalis | 337/401 |

FOREIGN PATENT DOCUMENTS

| | | | |
|---|---|---|---|
| 739 810 | 10/1943 | (DE) | 21/70 |
| 197 35 552 | 2/1999 | (DE) | H02H/3/08 |
| 0 513 405 | 11/1992 | (EP) | H02H/3/02 |
| 1 507 547 | 5/1975 | (GB) | F42B/3/18 |
| 2 166 010 | 4/1986 | (GB) | H01H/85/16 |
| 2 320 984 | 7/1998 | (GB) | H01H/85/12 |
| 100 557 42 | 2/1998 | (JP) | H01H/39/00 |

OTHER PUBLICATIONS

European Search Report dated Sep. 17, 1999.

*Primary Examiner*—Stephen W. Jackson
(74) *Attorney, Agent, or Firm*—Finnegan, Henderson, Farabow, Garrett & Dunner, L.L.P.

(57) ABSTRACT

A forced-fusion fuse has a casing, a heat generating material within the casing, a resistance wire for inducing a heat generation reaction to occur in the heat generating material, and a fusion member that is fused by the generation of heat from the heat generating material. When some damage or other has been caused to a wire harness or there is the fear that an impairment will occur therein as when the wire harness has been slight short-circuited, some abnormality or other has occurred in a load connected to the wire harness, or an automobile has collided with another automobile, the sensor unit senses this to thereby output an abnormality detection signal. A controller, upon receipt of the abnormality detection signal, causes the generation of heat in the resistance wire of the forced-fusion fuse. A heat generation reaction is induced, by the generation of heat in the resistance wire, to occur in the heat generating material, whereby the fusion member is fused by the heat generated from the heat generating material.

9 Claims, 5 Drawing Sheets

FORCED-FUSION FUSE AND CIRCUIT BREAKER

BACKGROUND OF THE INVENTION

The present invention relates to a forced-fusion fuse which when an abnormality has occurred due to short-circuiting of a wire harness within an automobile, a collision of automobiles, etc. compulsively interrupts the current between a power source and a respective load, and a circuit breaker that uses the forced-fusion fuse.

A conventional electrical system of an automobile uses a blade fuse or a large capacity fuse within a fuse box, thereby protecting a within-automobile wire harness when some abnormality or other has occurred in such wire harness or load (e g., power windows). A blade fuse and a large current fuse are fused when a large current has flown therein, As a result, the current between the battery and the wire harness in which an abnormality has occurred is interrupted, with the result that the wire harness or load is protected.

A large current fuse comprises a casing, first and second fuse terminals protruding from a lower end of the casing, a first connection plate within the casing that has been connected to the first fuse terminal, a second connection plate within the casing that has been connected to the second fuse terminal, a tin alloy on the first connection plate, and a fusion portion (or earth portion) connecting the first and second connection plates. A wire harness is connected to each of the fuse terminals. When the wire harness has been short-circuited whereby a large current has been caused to flow in the connection plate and a heat has been generated therein, the fusion portion is fused to thereby interrupt the current between the battery and the short-circuited wire harness. The tin alloy which is a low-melting-point metal is provided in correspondence with a rare short-circuiting and, by diffusion thereof, plays the role of causing the formation of an alloy layer on the fusion portion and thereby enlarging the resistance.

SUMMARY OF THE INVENTION

However, in the above-described electrical system, when an excessively large current has flown in the wire harness due to a slight short-circuiting resulting from a rub thereof with a body or the like of the automobile, the slight short-circuiting intermittently occurs and so the large current fuse is not fused, with the result that there is the possibility that the wire harness will be largely damaged.

When no short-circuiting occurs in the wire harness at the collision time of the automobile, no large current flows in the large current fuse and so the large current fuse is not fused. For this reason, even after an automobile has given rise to a collision accident, there is the possibility that the electric power will continue to flow from the battery to the load. Accordingly, during a disposing of the automobile accident, there is the possibility that the wire harness will be short-circuited and as a result an excessively large current will flow.

As one method of solving such a problem, there is a method wherein the capacity of the large current fuse is made small so that even at a slight short-circuiting of the wire harness, the large current fuse will be fused. However, as illustrated in FIG. 5, when making the capacity of the large current fuse small, the fuse cutoff-by-fusion characteristic approaches to the waveform of the start-up rush current of a motor which is a load. For this reason, when the start-up rush current (e.g., the start-up rush current of a motor, etc.) has flown in the load, there is the possibility that the large current fuse will be cut off by fusion.

In view of the above, an object of the present invention is to provide a forced-fusion fuse which when there is the fear that an abnormality will occur in a wire harness or the like can compulsively interrupt the current between the battery and the wire harness to thereby zero the adverse effect thereof upon the automobile.

To attain the above object, a first aspect of the present invention provides a forced-fusion fuse which comprises a casing, a heat generating material within the casing, inducing means for inducing the heat generating material to make a heat generation reaction, and a fusion member that is fused by the generation of heat in the heat generating material.

According to the above-described construction, the heat generation reaction of the heat generating material is induced to occur by the operation of the inducing means, whereby the heat generating material generates heat. When the temperature of the heat generated from the heat generating material rises up to a prescribed, or higher than prescribed, temperature, the fusion member is fused with the result that the flow of a current through the fusion member is stopped.

The heat generating material may include a mixture of a powder of metal oxide and a powder of aluminium.

As a result of this, the heat generating material becomes instantaneously high in temperature due to the thermit reaction between the metal oxide and aluminium, with the result that the fusion member is instantaneously fused.

The inducing means may cause the occurrence of a heat generation reaction of the heat generating material by heating and, in this case, may include a heating wire.

The inducing means may cause the occurrence of the heat generating material by arc discharge and, in this case, the inducing means may include an electrode for causing arc discharge.

A second aspect of the present invention provides a circuit breaker which comprises a sensor, a forced-fusion fuse, and a controller.

The forced-fusion fuse includes a casing, a heat generating material within the casing, inducing means for inducing the heat generating material to make a heat generation reaction, and a fusion member that is fused by the generation of heat by the heat generating material. The fusion member makes a connection between a battery and the electric parts of an automobile. The sensor senses an abnormal state in which it is necessary to stop the supply of the power from the battery to the electric parts of the automobile to thereby output an abnormality detection signal. The controller causes the operation of the inducing means when an abnormality detection signal has been output from the sensor. The heat generation reaction of the heat generating material is induced to occur by the inducing means, and the fusion member is fused by the generation of heat from the heat generating material to thereby interrupt the current between the battery and the electric parts of the automobile.

According to the above-described construction, for example, in an abnormal state in which it is necessary to stop the supply of the power from the battery to the electric parts of the automobile, as when the wire harness has fallen in an abnormality or a collision of automobiles has occurred, the sensor senses this abnormality and outputs an abnormality detection signal to the controller, whereby the controller causes the operation of the inducing means. Through the operation of the inducing means, the heat generating member generates heat and this heat fuses the fusion member, whereby the supply of the power from the battery to the electric parts of the automobile is interrupted.

DESCRIPTION OF THE PREFERRED EMBODIMENTS

Figure 1:
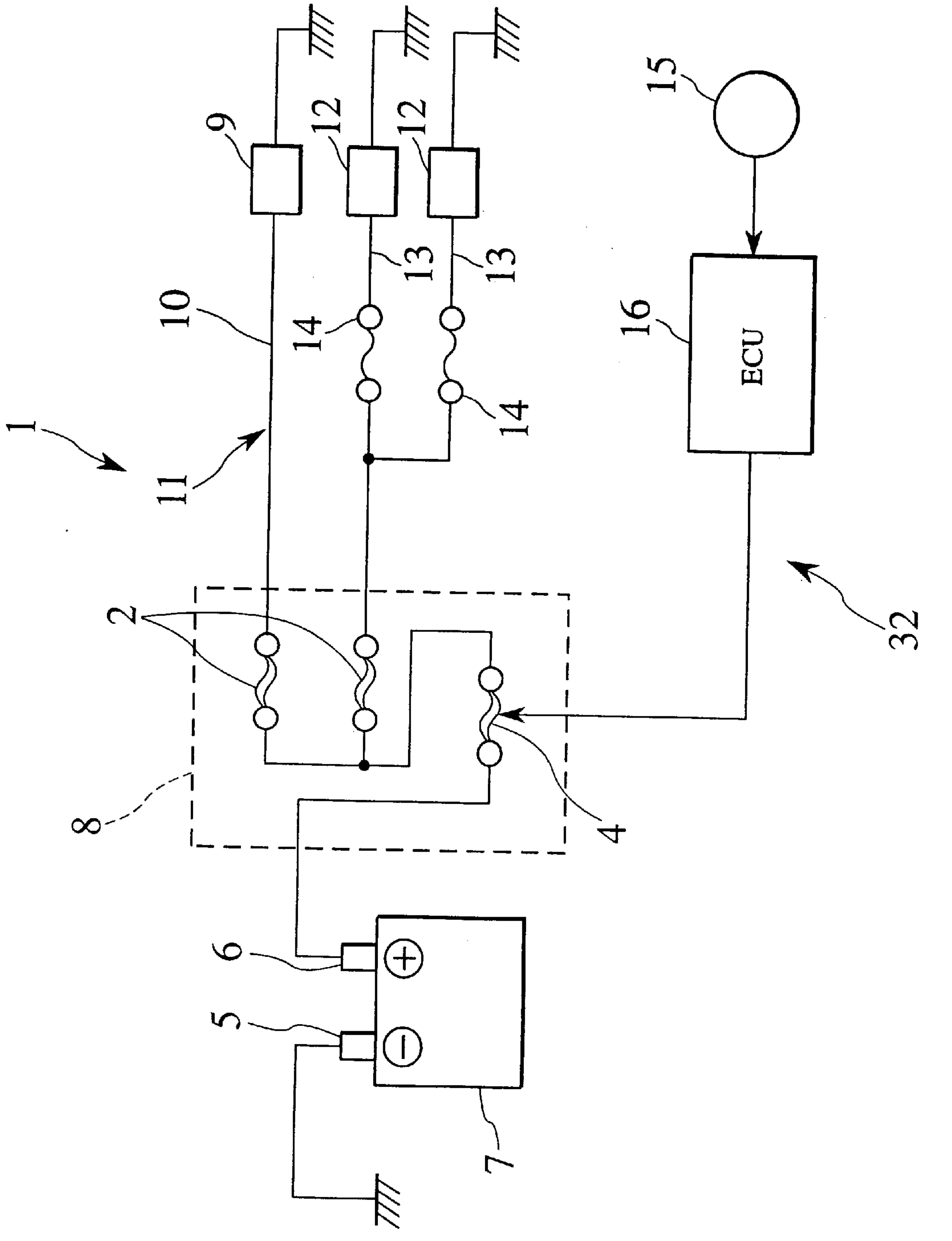
FIG. 1 is a block diagram illustrating an electrical system that uses a circuit breaker according to an embodiment of the present invention.

As illustrated in FIG. 1, an electrical system 1 for use on an automobile comprises a fuse box 8, electric wires 10, 13 constituting a wire harness 11, blade fuses 14, and a circuit breaker 32.

Within the fuse box 8, there are disposed a plurality of large current fuses 2 and a forced-fusion fuse 4. The fuse box 8 has applied thereto a battery voltage that is output from a plus terminal 6 of a battery 7. A minus terminal 5 of the battery 7 is grounded.

The electric wire 10 makes connection between the fuse box 8 and a load 9 such as a power window. The electric wire 10 supplies a power of the battery from the fuse box 8 to the load 9. The electric wires 13 connect the fuse box 8 and respective loads 12. The electric wires 13 distribute the power of the battery to the respective loads 12. The respective blade fuses 14 are disposed at midway positions of their corresponding electric wires 13. When short-circuiting or the like has occurred in the load 12, the blade fuse 14 is fused by a current flowing through the electric wires 13. As a result, the supply of power from the battery is cut off.

The circuit breaker 32 comprises the forced-fusion fuse 4, a sensor unit 15, and a controller (ECU) 16.

The sensor unit 15 senses an abnormal state in which it is necessary to stop the supply of power from the battery to the respective loads 9 and 12, to thereby output an abnormal detection signal to the ECU 16. The "abnormal state" means, for example, a state where an impact causing some abnormality or other has been applied to the wire harness 115 a state where a current flowing through the wire harness 11 has continuously exceeded a prescribed value, or a state where the temperature of the wire harness 11 has become higher than a prescribed temperature. Accordingly, the sensor unit 15 is constituted by an acceleration sensor for use on an air bag, a current sensor, a temperature sensor, etc. and these sensors are disposed in the respective portions of an automobile involved. When an abnormality detection signal has been output from the sensor unit 15, the ECU 16 generates a fusion current and thereby causes a compulsive fusion of the forced-fusion fuse within the fuse box 8.

Figure 2:
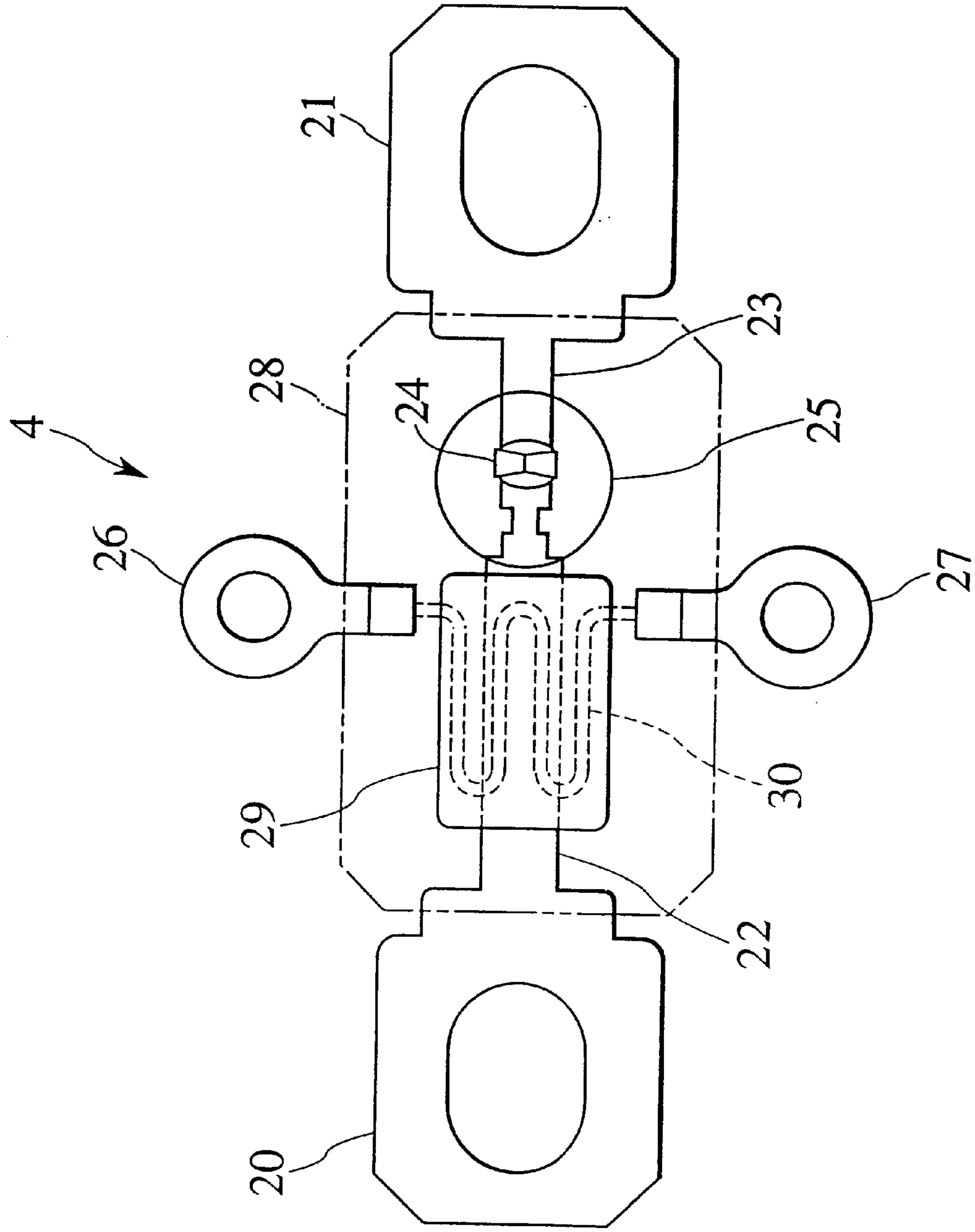
FIG. 2 is a plan view illustrating a detailed construction of a forced-fusion fuse illustrated in FIG. 1.

As illustrated in FIG. 2, the forced-fusion fuse 4 has two sheets of fuse terminals 20, 21, two sheets of connection plates 22, 23, a large current fuse portion 25, two sheets of heater terminals 26, 27, a ceramic casing 28, a heat generating material 29, and a resistance wire 30 for use on the heater, and these elements are constructed as one unit.

The fuse terminal 20 is connected to the plus terminal 6 of the battery 7 and the fuse terminal 21 is connected to respective one ends of the large current fuse 2. Each of the connection plates 22, 23 is made of a copper alloy, zinc alloy or the like. The connection plate 22 has one end portion bonded to the fuse terminal 20 and the other end portion smaller in width than the one end. The connection plate 23 has one end portion bonded to the fuse terminal 21 and the other end portion that has been overlapped on the other end portion of the connection plate 22. The large current fuse portion 25 is constituted by the other end portions of the connection plates 22, 23 and a low-melting-point metal member 24. The low-melting-point metal member 24 is made of, for example, a material having the capability of diffusing action such as tin and connects the connection plates 22 and 23 to each other mechanically and electrically. Upon application of heat to the large current fuse portion 25, the low-melting-point metal member 24 is fused, whereby the connection plates 22 and 23 are separated from each other mechanically and electrically.

The ceramic casing 28 covers the connection plates 22, 23, large current fuse portion 25 and resistance wire 30.

Figure 3:
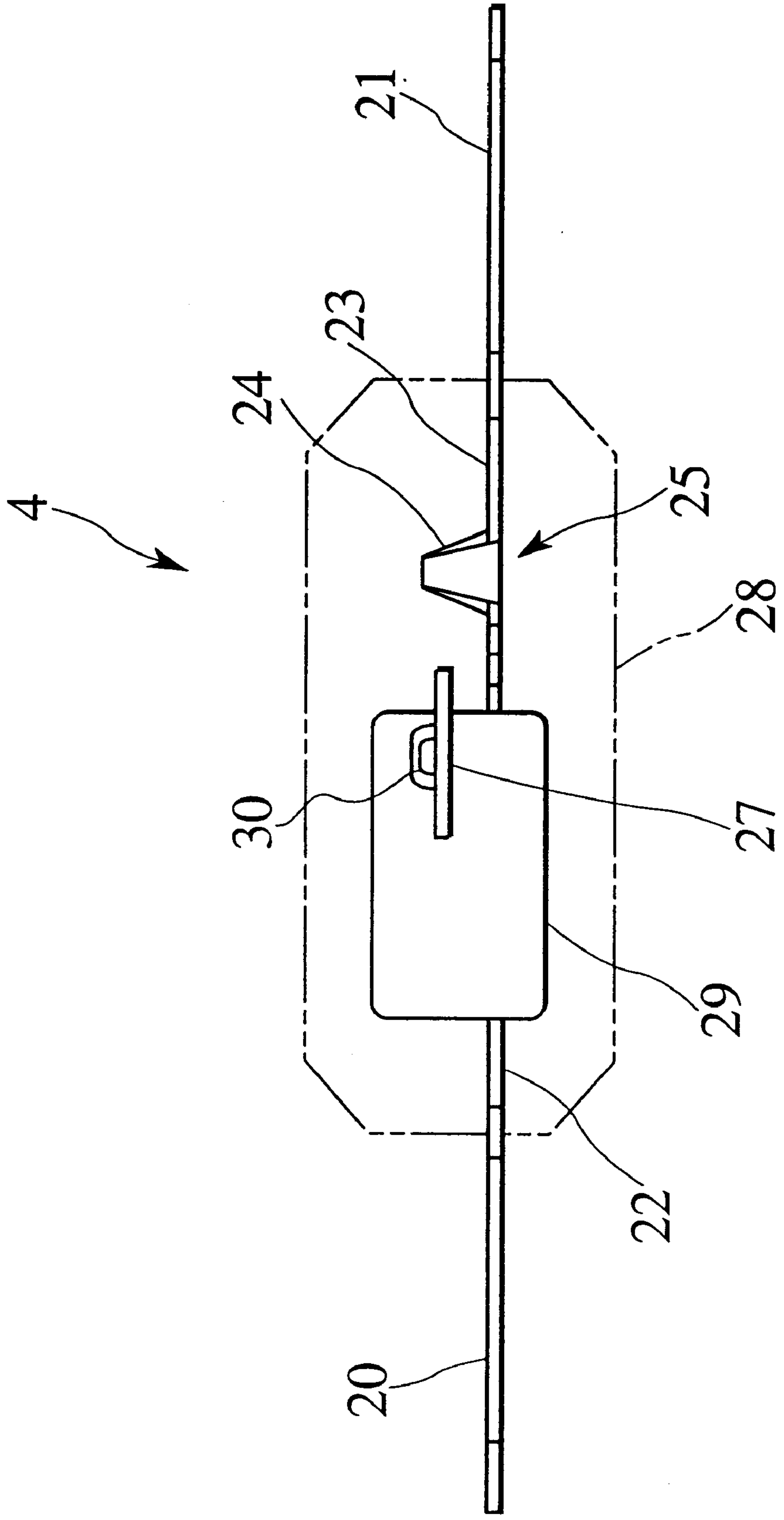
FIG. 3 is a front view of FIG. 2.

The resistance wire 30 is disposed close to the large current fuse portion 25 and connects the heater terminals 26 and 27 to each other. The fusion current that is output from the ECU 16 flows from the heater terminal 26 to the heater terminal 27 through the resistance wire 30. The heat generating material 29 is formed by solidifying a mixture of a powder of aluminium and a powder of metal oxide ($Fe_3O_3$, $Cr_2O_3$, $MnO_2$, CuO, etc.) by the use of an adhesive agent. As illustrated in FIG. 3, the heat generating material 29 is disposed within a space formed by the ceramic casing 28 in such a way as to cover the connection plate 22. The resistance wire 30 is disposed within the ceramic casing 28 and, by the fusion current flowing between the heater terminals 26 and 27, generates heat and thereby induces a heat generating reaction to occur in the heat generating material 29.

When a large current has flown in the wire harness 11 due to the occurrence of some abnormality or other in the wire harness 11, respective loads 9, 12 connected thereto, or the like, the blade fuse 14 and/or large current fuse 2 is fused to thereby interrupt the flow of the current between the wire harness 11 In which an abnormality has occurred and the battery 7 and thereby protect the wire harness 11 in which an abnormality has occurred and the respective loads 9, 12 connected thereto.

Also, when the wire harness 11 is rubbed by the body, etc, of the automobile and as a result slight short-circuiting occurs with the result that the magnitude of a drive current flowing in the wire harness 11 has varied or the temperature of the wire harness 11 has varied, the current sensor and temperature sensor constituting the sensor unit 15 detects this to thereby output an abnormality detection signal. As a result of this, a fusion current is output from the ECU 16 and the resistance wire 30 of the forced-fusion fuse 4 generates heat, whereby a heat generating reaction is induced to occur in the heat generating material 29.

As a result, a chemical reaction occurs between the metal oxide powder and aluminium powder constituting the heat generating material 29, with the result that a heat (the heat equal to or higher than 2000° C.) sufficient to melt the copper alloy and the like constituting the connection plates 22, 23 is generated. By this heat, the large current fuse portion 25 and the connection plates 22, 23 are fused with the result that the fuse terminals 20, 21 are mechanically and electrically separated from each other, whereby the flow of the current between the wire harness 11 in which an abnormality has occurred and the battery 7 is interrupted.

Accordingly, the wire harness 11 in which an abnormality has occurred and the respective loads 9, 12 connected thereto are protected.

In this case, if a powder of iron oxide is being used as the metal oxide, the aluminium is not only oxidized but the iron is reduced, whereby a heat equal to or higher than 2000° C. is instantaneously generated through the occurrence of the following chemical reaction (thermit reaction).

$$2Al+(3/2)O_2 \rightarrow Al_2O_3+386.2\ [Kcal]$$

Also, in a case where an automobile has collided with another automobile or the like, the acceleration sensor constituting the sensor unit 15 senses this to thereby output an abnormality detection signal. As a result, as in the above-described case, a fusion current is output from the ECU 16, the resistance wire 30 of the forced-fusion fuse 4 generates heat. a heat generating reaction is induced to occur in the heat generating material 29, and, due to the generation of heat in the heat generating material 29, the large current fuse portion 25 and connection plates 22, 23 are fused.

In this way, in this embodiment, there is used a circuit breaker 32 comprising the forced-fusion fuse 4 between the battery 7 and the large current fuse 2, the sensor unit 15 for sensing a collision of automobiles, etc., and the ECU 16 for compulsively fusing the forced-fusion fuse 4 according to the sensed results of the sensor unit 15. For this reason, when some damage or other has teen caused to the wire harness 11 or there is the fear that an impairment will occur as when the wire harness 11 has been slight short-circuited, some abnormality or other has occurred in the respective loads 9, 12 connected to the wire harness 11. or an automobile has collided with another automobile, the sensor unit 15 senses this. As a result, the ECU 16 causes the generation of heat in the resistance wire 30 of the forced-fusion fuse 4 to induce a heating reaction to occur in the heat generating material 29, whereby the large current fuse portion 25 or connection plates 22, 23 are fused. Therefore, when some abnormality or other has occurred in the wire harness 11 or there is the fear that an abnormality will occur therein as when the wire harness 11 provided in an automobile has become abnormal or an automobile has collided with another one or the like, the forced-fusion fuse 4 that is supplying power to the wire harness 11 in which an abnormality is likely to occur is fused to thereby interrupt the current between the battery 7 and the wire harness 11. Accordingly, it is possible to zero an adverse effect upon an automobile due to an abnormality such as that of the wire harness 11.

Also, since in this embodiment the forced-fusion fuse 4 is constructed as a single unit, after the current between the battery 7 and the wire harness 11 has been interrupted due to the fusion of the forced-fusion fuse 4, a mere one-touch replacement of the forced-fusion fuse 4 enables easy restoration of it.

Also, in this embodiment, the heat for fusing the large current fuse portion 25 and the connection plates 22, 23 is procured through the thermit reaction between the powder of the metal oxide and the powder of the aluminium. Since in the thermit reaction a high-temperature heat is generated in a short time, the large current fuse portion 25 and respective connection plates 22, 23 are instantaneously fused. Accordingly, even when a collision accident of automobiles or the like has taken place, before the impairment of the wire harness 11 and the like occurs, the current between the battery 7 and the wire harness 11 in which there is the fear that an abnormality will occur can be interrupted.

Figure 4:
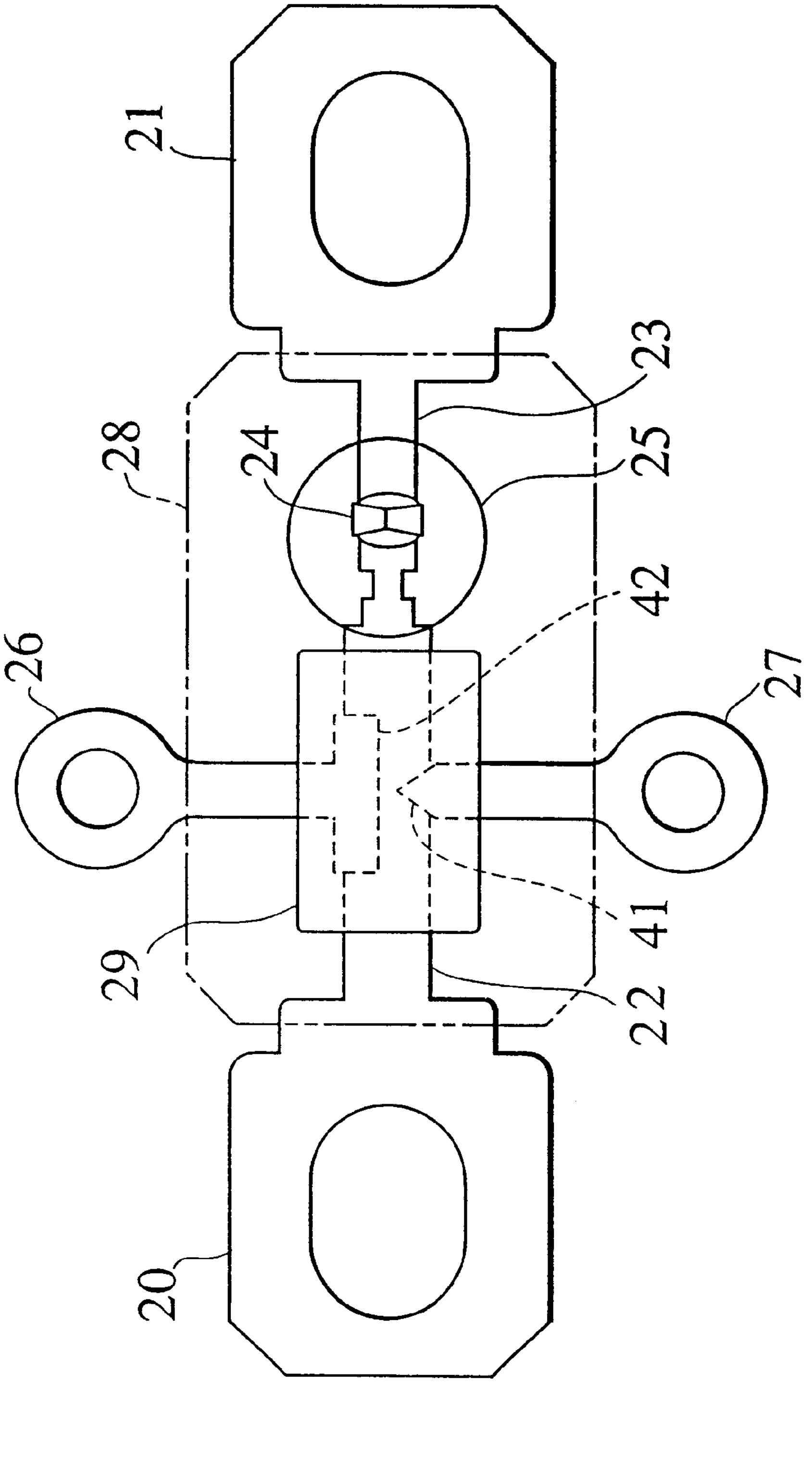
FIG. 4 is a plan view illustrating another example of a forced-fusion fuse.
Figure 5:
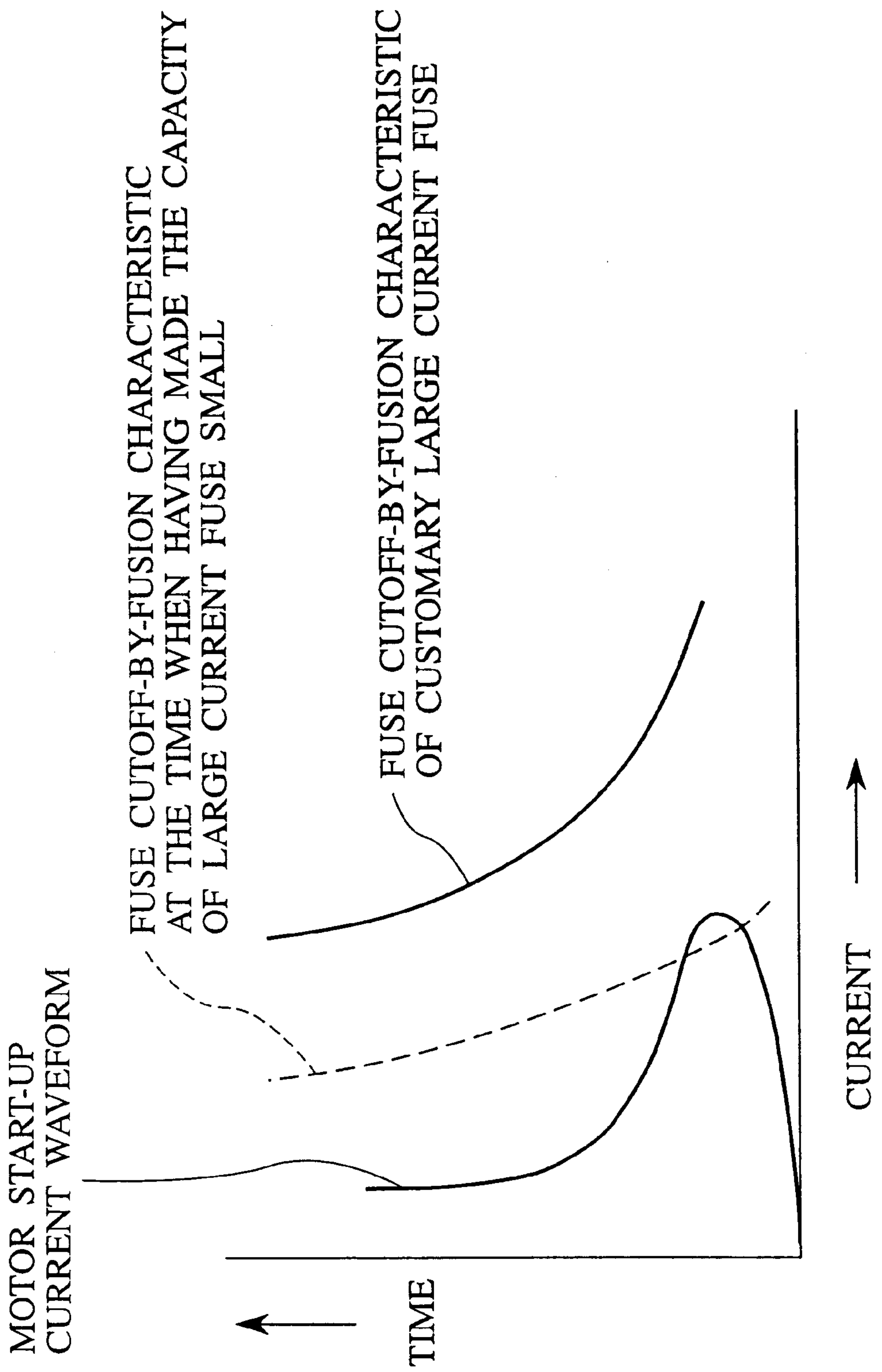
FIG. 5 is a graph illustrating the relationship between the current flowing through a wire harness and the start-up rush current and stationary current flowing through a respective load.

Further, although in this embodiment the resistance wire 30 for use on the heater has been provided as the inducing means, in place thereof the reaction of the heat generating material 29 may be induced to occur by arc discharge between positive electrode 41 of terminal 27 and negative electrode 26 of terminal 26, as illustrated in FIG. 4.

What is claimed is:

1. A circuit breaker comprising:

a forced-fusion fuse including a casing, a heat generating material within the casing, inducing means for inducing a heat generation reaction to occur in the heat generating material and a fusion member that is fused by the generation of heat in the heat generating material, the fusion member connecting a battery and electric parts of an automobile;

a sensor for sensing an abnormal state in which it is necessary to stop the supply of power from the battery to the electric parts of the automobile to thereby output an abnormality detection signal, and a controller which when an abnormality detection signal has been output from the sensor operates the inducing means, whereby a heat generation reaction is induced to occur in the heat generating material by the inducing means; and the fusion member is fused by the generation of heat from the heat generating material to thereby inapt the current between the battery and the electric parts of the automobile.

2. A fuse for disabling an electrical circuit, the fuse comprising:

a casing;

a first fuse terminal having a first portion arranged in the casing;

a second fuse terminal having a second portion arranged in the casing;

a fuse member connecting the first portion and the second portion;

a heat generating material surrounding one of the first portion and the second portion, the heat generating material being within said casing; and an activation element for triggering a reaction in the heat generating material, whereby said reaction causes the fuse member to fuse and prevents flow of current through the fuse.

3. The fuse according to claim 2, wherein the activation element comprises:

a first heater terminal;

a second heater terminal;

and a electrical wire connecting the first heater terminal to the second heater terminal, the electrical wire being disposed within said heat generating material.

4. The fuse according to claim 2, wherein the activation element comprises:

a first heater terminal having a positive electrode disposed within said heat generating material;

a second heater terminal having a negative electrode disposed within said heat generating material; whereby an arc discharge may occur between the positive electrode and the negative electrode to trigger the reaction of the heat generation material.

5. The fuse according to claim 3 or 4, wherein the fuse further comprises a controller, said controller induces a current to flow between the first heater terminal and the second heater terminal.

6. The fuse according to claim 2, wherein a portion of the activation element is arranged within the heat generating material.

7. A circuit breaker comprising:

a fuse including a casing, a first fuse terminal having a first portion arranged in the casing, a second fuse terminal having a second portion arranged in the casing, a fuse member connecting the first portion and the second portion to allow electricity to flow from a battery to electrical parts of an automobile, a heat generating material surrounding one of the first portion and the second portion, the heat generating material being within said casing, and an activation element for triggering a reaction in the heat generating material, whereby said reaction causes the fuse member to fuse preventing flow of current through the fuse;

a sensor for sensing an abnormal state necessitating stopping the flow of electricity from the battery to electrical parts of an automobile; and a controller for activating the activation element upon detection of a signal from the senor causing the fuse member to fuse.

8. The circuit breaker according to claim 7, wherein the activation element includes a first heater terminal, a second heater terminal, and a electrical wire connecting the first heater terminal to the second heater terminal, the electrical wire being disposed within said heat generating material.

9. The circuit breaker according to claim 8, wherein the activation element includes a first heater terminal having a positive electrode disposed within said heat generating material and a second heater terminal having a negative electrode disposed within said heat generating material, whereby an arc discharge may occur between the positive electrode and the negative electrode triggering the reaction of the heat generation material.

* * * * *

UNITED STATES PATENT AND TRADEMARK OFFICE

CERTIFICATE OF CORRECTION

PATENT NO. : 6,243,245 B1
DATED : June 5, 2001
INVENTOR(S) : Mitsuhiko Totsuka et al.

It is certified that error appears in the above-identified patent and that said Letters Patent is hereby corrected as shown below:

Column 6,
Line 25, "inapt" should read -- interrupt --.
Line 48, "a electrical" should read -- an electrical --.

Column 8,
Line 6, "a electrical" should read -- an electrical --.

Signed and Sealed this

Seventh Day of May, 2002

Attest:

JAMES E. ROGAN

*Attesting Officer*

*Director of the United States Patent and Trademark Office*